United States Patent
Zhou et al.

(10) Patent No.: US 10,996,000 B2
(45) Date of Patent: May 4, 2021

(54) ABSORPTION-BASED SYSTEM FOR AUTOMOTIVE WASTE HEAT RECOVERY

(71) Applicant: Toyota Motor Engineering & Manufacturing North America, Inc., Erlanger, KY (US)

(72) Inventors: Feng Zhou, South Lyon, MI (US); Douglas G. Thorpe, Mt. Sterling, KY (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 297 days.

(21) Appl. No.: 14/932,564

(22) Filed: Nov. 4, 2015

(65) Prior Publication Data
US 2017/0120725 A1    May 4, 2017

(51) Int. Cl.
*F28D 15/02*    (2006.01)
*B60H 1/32*    (2006.01)
(Continued)

(52) U.S. Cl.
CPC ............ *F28D 15/02* (2013.01); *B60H 1/025* (2013.01); *B60H 1/20* (2013.01); *B60H 1/3201* (2013.01);
(Continued)

(58) Field of Classification Search
CPC ... B60H 1/02; B60H 1/20; B60H 1/04; B60H 1/00885; B60H 1/025; B60H 1/3201;
(Continued)

(56) References Cited

U.S. PATENT DOCUMENTS 2,783,622 A * 3/1957 Bourassa ................. B60H 1/20
165/43
2,839,274 A * 6/1958 Polin .................... B60H 1/3201
123/25 R
(Continued)

FOREIGN PATENT DOCUMENTS

GB    2063444 A * 6/1981 ............ F25B 27/007

OTHER PUBLICATIONS

Hendricks, "Heat Pipe/Two-Phase Flow Systems for Vehicle Passenger Cabin Cooling", SAE Technical Paper Series, Jun. 3-5, 2002, (15 pages).
(Continued)

*Primary Examiner* — Jianying C Atkisson
*Assistant Examiner* — Miguel A Diaz
(74) *Attorney, Agent, or Firm* — Christopher G. Darrow; Darrow Mustafa PC (57) ABSTRACT

An absorption cycle based system is disclosed for using waste heat from a vehicle and providing selective heating, cooling, and dehumidifying to a vehicle compartment. The system includes a waste heat loop in thermal communication with a power generating unit of the vehicle, and a vapor absorption subsystem. The vapor absorption subsystem may include a thermal compressor in thermal communication with the waste heat loop, a radiator unit, a condensing unit for heating the vehicle compartment, an evaporating unit for selectively cooling and dehumidifying the vehicle compartment, and a plurality of valves configured to selectively direct refrigerant through the vapor absorption subsystem. The vehicle compartment may include at least one of a passenger cabin, an electronics housing, a battery pack, an engine compartment, and a refrigeration compartment.

13 Claims, 2 Drawing Sheets

(51) Int. Cl.
*B60H 1/02* (2006.01)
*F25B 27/02* (2006.01)
*B60H 1/20* (2006.01)
*F25B 15/04* (2006.01)
*F25B 15/06* (2006.01)
*F25B 15/10* (2006.01)

(52) U.S. Cl.
CPC .......... *B60H 1/32011* (2019.05); *F25B 27/02* (2013.01); *F25B 15/04* (2013.01); *F25B 15/06* (2013.01); *F25B 15/10* (2013.01); *Y02A 30/274* (2018.01)

(58) Field of Classification Search
CPC ........ F25B 25/02; F25B 27/007; F25B 27/02; F25B 27/002; F25B 41/04; F28D 15/02; F28D 2021/0061
See application file for complete search history.

(56) References Cited

U.S. PATENT DOCUMENTS

| | | | | |
|---|---|---|---|---|
| 3,661,200 | A * | 5/1972 | McNamara | B60H 1/3201 165/42 |
| 4,028,078 | A * | 6/1977 | Peckham | F25B 15/006 62/101 |
| 4,100,756 | A * | 7/1978 | Albertson | F25B 27/007 62/235.1 |
| 4,133,183 | A * | 1/1979 | Albertson | F25B 15/06 62/235.1 |
| 4,171,619 | A * | 10/1979 | Clark | F25B 25/02 62/235.1 |
| 4,285,211 | A * | 8/1981 | Clark | F25B 25/02 62/235.1 |
| 4,307,575 | A * | 12/1981 | Frosch | B60H 1/3201 62/148 |
| 4,380,909 | A * | 4/1983 | Sung | F02G 5/00 62/101 |
| 4,386,501 | A * | 6/1983 | Jaeger | F25B 15/00 62/112 |
| 4,719,767 | A * | 1/1988 | Reid, Jr. | C09K 5/047 62/324.2 |
| 5,383,341 | A * | 1/1995 | Zur | B60H 1/00007 62/112 |
| 5,896,747 | A * | 4/1999 | Antohi | B60H 1/3201 62/101 |
| 6,212,902 | B1 * | 4/2001 | Leistner | F25B 15/10 62/238.3 |
| 7,096,925 | B2 * | 8/2006 | Bracciano | B60H 1/00392 165/42 |
| 7,140,427 | B2 * | 11/2006 | Honda | B60H 1/00907 165/202 |
| 7,152,422 | B2 * | 12/2006 | Takano | B60H 1/00878 62/238.6 |
| 7,438,826 | B1 * | 10/2008 | Chen | C08J 9/149 252/67 |
| 8,384,212 | B2 * | 2/2013 | Otsuka | H01L 21/50 257/710 |
| 9,689,592 | B2 * | 6/2017 | Tomita | F25B 30/04 |
| 9,784,484 | B2 * | 10/2017 | El-Shaarawi | F25B 27/007 |
| 9,789,744 | B2 * | 10/2017 | Steele | F25B 25/005 |
| 2003/0221438 | A1 * | 12/2003 | Rane | B01D 53/263 62/271 |
| 2006/0059933 | A1 * | 3/2006 | Axakov | B60H 1/00 62/244 |
| 2008/0066473 | A1 * | 3/2008 | Henning | B60H 1/3201 62/101 |
| 2009/0205350 | A1 * | 8/2009 | Takahashi | B60H 1/00878 62/238.6 |
| 2010/0293966 | A1 * | 11/2010 | Yokomachi | B60H 1/02 62/3.2 |
| 2011/0005235 | A1 * | 1/2011 | Sang | B60H 1/00428 62/3.1 |
| 2011/0289953 | A1 * | 12/2011 | Alston | B60H 1/32 62/238.6 |
| 2012/0031131 | A1 * | 2/2012 | Danov | B60H 1/3201 62/239 |
| 2012/0085105 | A1 * | 4/2012 | Quisenberry | B60H 1/00478 62/3.2 |
| 2012/0160447 | A1 * | 6/2012 | Kinomura | F01P 11/20 165/51 |
| 2012/0266618 | A1 * | 10/2012 | Levy | F24F 3/1417 62/101 |
| 2012/0285189 | A1 * | 11/2012 | Takeda | F01K 3/24 62/235.1 |
| 2013/0047639 | A1 * | 2/2013 | Stannard | B60H 1/3201 62/79 |
| 2013/0319028 | A1 * | 12/2013 | Tsubouchi | F25B 30/04 62/238.3 |
| 2014/0042234 | A1 * | 2/2014 | Moser | B60H 1/025 237/12.4 |
| 2014/0047853 | A1 * | 2/2014 | Zhong | B60H 1/3201 62/106 |
| 2014/0053579 | A1 * | 2/2014 | Shaikh | F25B 27/00 62/79 |
| 2014/0130530 | A1 * | 5/2014 | Tomita | B60H 1/3201 62/150 |
| 2014/0137813 | A1 * | 5/2014 | Gross | F25B 27/02 122/18.3 |
| 2014/0223933 | A1 * | 8/2014 | Steele | F25B 25/005 62/98 |
| 2014/0298837 | A1 * | 10/2014 | Tanda | B60H 1/00921 62/150 |
| 2014/0305154 | A1 * | 10/2014 | Yoshioka | F25B 41/04 62/324.6 |
| 2015/0129160 | A1 * | 5/2015 | Burk | B60H 1/3201 165/42 |
| 2015/0176869 | A1 * | 6/2015 | Said | F25B 17/00 62/101 |
| 2015/0267945 | A1 * | 9/2015 | Chen | F24D 11/003 62/235.1 |
| 2015/0273974 | A1 * | 10/2015 | Levin | B60H 1/005 62/101 |
| 2015/0300702 | A1 * | 10/2015 | Said | F25B 27/007 62/99 |
| 2016/0033175 | A1 * | 2/2016 | Ragazzi | F25B 13/00 62/115 |
| 2016/0101667 | A1 * | 4/2016 | Riviere | F25B 17/08 62/56 |
| 2016/0195313 | A1 * | 7/2016 | Finkleman | F24F 5/0007 62/3.3 |
| 2016/0257181 | A1 * | 9/2016 | Zhou | B60H 1/3201 |
| 2016/0313013 | A1 * | 10/2016 | Chaudhry | F24F 1/027 |
| 2016/0315491 | A1 * | 10/2016 | Zhou | H01M 14/00 |
| 2017/0030612 | A1 * | 2/2017 | Michel | F25B 17/083 |
| 2017/0113514 | A1 * | 4/2017 | Tsubouchi | B60H 1/00271 |
| 2017/0120725 | A1 * | 5/2017 | Zhou | B60H 1/02 |
| 2017/0144508 | A1 * | 5/2017 | Tsubouchi | B60H 1/3201 |
| 2017/0184329 | A1 * | 6/2017 | Kim | F24S 10/00 |
| 2017/0314826 | A1 * | 11/2017 | Cogswell | F25B 25/02 |
| 2018/0003415 | A1 * | 1/2018 | El-Shaarawi | F25B 15/002 |
| 2018/0149393 | A1 * | 5/2018 | Srichai | F01N 5/02 |
| 2018/0194196 | A1 * | 7/2018 | Shepard | B60H 1/025 |
| 2018/0257480 | A1 * | 9/2018 | Zhou | B60K 6/365 |
| 2018/0272840 | A1 * | 9/2018 | Onishi | B60H 1/03 |
| 2019/0118618 | A1 * | 4/2019 | Elsherbini | F25B 1/06 |

OTHER PUBLICATIONS

Yamada et al., "Fundamental experiment of pumpless Rankine-type cycle for low-temperature heat recovery", 2011, pp. 10-117 (8 pages).

Yang et al., "Waste heat recovery using heat pipe heat exchanger for heating automobile using exhaust gas", 2003, pp. 367-372 (6 pages).

Wang et al., "Performance enhancement of a thermally activated cooling system using microchannel heat exchangers", 2011, pp. 2951-2962 (12 pages).

(56) References Cited

OTHER PUBLICATIONS

Bell "Ammonia Absorption Refrigerators", Sundance Custom RV Inc., Sep. 29, 2012, (8 pages).
Kalinowski et al., "Application of waste heat powered absorption refrigeration system to the LNG recovery process", ScienceDirect, 2009, pp. 687-694 (8 pages).
UK Essays, "Vapor Absorption Refrigeration Cycle for Automobile Engineering Essay", Nov. 2013, (5 pages).
Sprouse III et al., "Review of organic Rankine cycles for internal combustion engine exhaust waste heat recovery", Applied Thermal Engineering, (2013), pp. 711-722 (12 pages).

* cited by examiner

ABSORPTION-BASED SYSTEM FOR AUTOMOTIVE WASTE HEAT RECOVERY

TECHNICAL FIELD

The present disclosure generally relates to the management of waste heat recovery, and more particularly, to systems and methods for recapturing energy and improving heating and cooling techniques.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Historically, the fundamental components and operation of automotive heating and air conditioning systems for internal combustion engines have been designed to be independent from one another. For example, the energy needed for heating purposes is commonly taken from an engine coolant, while the energy needed for cooling purposes is commonly taken from a refrigeration cycle. Typical air conditioning systems may further require a compressor unit that draws power from a drive shaft or other electrical system. Compressor based air conditioning can significantly impact fuel economy, as well as tailpipe emissions, of both conventional and hybrid electric vehicles. It has been shown that certain air conditioning systems reduce the fuel economy of high fuel economy vehicles by as much as 50%. Similarly, the fuel economy of mid-sized vehicles can be reduced by more than 20%, while at the same time increasing NO emissions by up to 80%, and CO emissions by up to 70%.

Renewable energy sources are becoming increasingly important. Various benefits can be obtained when waste heat is captured and converted into a form of usable energy. Secondary waste heat or low-grade heat (generally less than 150° C.) is abundant and often available as discharged heat from vehicles. Often, however, conventional thermal energy collecting and storage systems may not work well when used with low-grade heat, and this abundant resource is not able to be utilized to its potential.

Accordingly, it would be desirable to provide a further optimized conversion of waste or low-grade thermal energy for use with combined heating and cooling systems.

SUMMARY

This section provides a general summary of the disclosure, and is not a comprehensive disclosure of its full scope or all of its features.

In various aspects, the present teachings provide an absorption cycle based system for using waste heat from a vehicle and providing selective heating, cooling, and dehumidifying to a vehicle compartment. The first system may include a waste heat loop in thermal communication with a power generating unit of the vehicle, and a vapor absorption subsystem. The vapor absorption subsystem may include a thermal compressor in thermal communication with the waste heat loop. The subsystem may also include a radiator unit, a condensing unit for heating the vehicle compartment, and an evaporating unit for selectively cooling and dehumidifying the vehicle compartment. A plurality of valves may be provided configured to selectively direct refrigerant through the components of vapor absorption subsystem. The vehicle compartment may include at least one of a passenger cabin, an electronics housing, a battery pack, an engine compartment, and a refrigeration compartment.

In other aspects, the present teachings provide an absorption cycle based system for using waste heat from a vehicle and providing selective heating, cooling, and dehumidifying to a vehicle compartment. The second system may include a heat exchanger in thermal communication with a power generating unit of the vehicle and configured to provide a substantially uniform waste heat output, and a vapor absorption subsystem. The vapor absorption subsystem may include a thermal compressor with a separator in thermal communication with the heat exchanger, and an absorber. The subsystem may also include a radiator unit, a condensing unit for heating the vehicle compartment, and an evaporating unit for selectively cooling and dehumidifying the vehicle compartment. A first valve may be provided and configured to selectively direct refrigerant from the separator to the radiator unit and the condensing unit. A second valve may be provided and configured to selectively direct refrigerant from the condensing unit to one or both of the evaporating unit and the absorber. A throttling valve may be provided disposed between the condensing unit and the evaporating unit. A bypass loop may be provided, configured for directing refrigerant from the condensing unit to the absorber, and bypassing the evaporating unit.

In still other aspects, the present teachings provide a method for selectively heating, cooling, and dehumidifying a vehicle compartment using waste heat recovered from a vehicle. The method may include collecting waste heat from a power generating unit of the vehicle. The waste heat may be used to operate a thermal compressor of a vapor absorption subsystem. The operations may selectively include generating a cooling effect in the vehicle compartment by condensing a vapor phase refrigerant within a radiator, and directing a flow of condensed refrigerant through a throttling valve to an evaporating unit in thermal communication with the vehicle compartment. The operations may also selectively include generating a heating effect in the vehicle compartment by directing a flow of vapor phase refrigerant to a condensing unit in thermal communication with the vehicle compartment. The operations may also selectively include dehumidifying the vehicle compartment by condensing a vapor phase refrigerant within a radiator and directing a flow of condensed refrigerant through a three way valve. The dehumidification process may include directing a portion of the condensed refrigerant though the throttling valve to the evaporating unit, and directing a remainder of the condensed refrigerant to the thermal compressor. The method may include passing humid air through the cooled evaporating unit to condense water vapor prior to passing the air though the evaporating unit to heat the air that is subsequently directed into the vehicle compartment.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The following description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The present technology relates to the management of waste heat recovered from a vehicle, and provides systems and methods for recapturing energy and improving heating and cooling techniques. Specifically, the present technology recovers waste heat from a power generating unit of a vehicle and provides an absorption based system that makes use of the recovered waste heat for the combined and selective cooling, heating, and dehumidifying of various vehicle compartments. As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc.

In various non-limiting aspects, the present technology may be applicable to hydrocarbon/fossil-fuel (or equivalent) based internal combustion engine vehicles, as well as to hybrid electric vehicles typically having an internal combustion engine as a power generating unit. In other aspects, the present technology may be applicable to fuel cell powered vehicles, for example, vehicles having at least one fuel cell or fuel cell stack as a power generating unit to drive a motor. There are two main sources of heat from power generating units, which may include an exhaust gas and a coolant fluid. For example, internal combustion engines and fuel cell stacks may generate heated exhausts through an engine exhaust loop and/or may require cooling that may be accomplished by using various coolant fluids circulated through an engine coolant loop or conduit system. Typical vehicle power generating units may have an operating temperature of from about 85° C. to about 110° C. for an internal combustion engine, and slightly lower, or from about 60° C. to about 100° C. for a fuel cell or hybrid-electric powered vehicle. The temperature ranges for exhaust streams may range from about 500° C. to about 900° C. for an internal combustion engine, and slightly lower for hybrid-electric powered vehicle. The temperature range for a fuel cell exhaust stream will vary based on the fuel cell type, but may range from about 60° C. to about 160° C., and the exhaust stream generally contains hot air and water vapor. The present technology is configured to operate with an engine coolant generally at or near the temperature of the respective power generating units. Thus, as a non-limiting example, the engine coolant is commonly from about 85° C. to about 110° C. for an internal combustion engine. The present technology may also be configured to use waste heat generally at or lower than the temperature of the exhaust streams of the power generating units.

Figure 1:
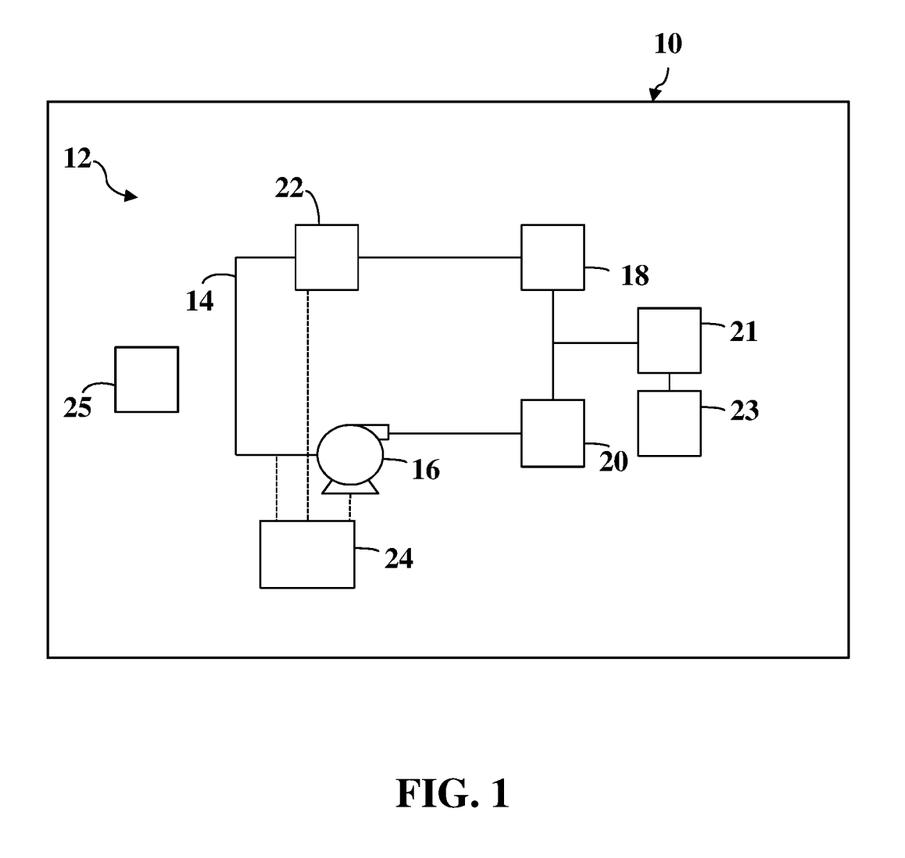
FIG. 1 is an exemplary, simplified diagram illustrating a vehicle configured with an absorption cycle based system for using waste heat from a vehicle and providing selective heating, cooling, and dehumidifying to a vehicle compartment in an accordance with various aspects of the present technology.

FIG. 1 illustrates an exemplary, simplified diagram of a vehicle 10 configured with an absorption cycle based system 12 for providing selective heating, cooling, and dehumidifying features in an accordance with various aspects of the present technology. It should be understood that not all of the components provided in the figures may be used in each aspect, and similarly not all of the components are necessarily shown for clarity reasons. As depicted, the vehicle 10 may include a waste heat loop, or a waste heat conduit system 14, that is optionally configured with a pump 16 to circulate an engine coolant fluid and/or engine exhaust stream in a continuous-type loop manner in order to remove heat from a power generating unit 20 and transfer the heat to a desired component. As described above, the type of power generating unit 20 may vary based on the type of vehicle.

The conduit system 14 may include a combination of multiple different types of conduit systems, and should not be limited to one conduit, or one type of heat transfer. As will be described in more detail below, the conduit system 14 may also be in thermal communication with solar energy collectors 21 that may be used to provide a supplemental heat source when the power generating units 20 are not in an operational mode, or are not otherwise generating heat. The solar energy collectors 21 may additionally or alternatively be used to generate electricity that may be used to provide a source of heat. Still further, the conduit system 14, as well as other components, may be used in combination with various phase change materials designed to provide a capability of storing and releasing large amounts of thermal energy for later use. Several other components, such as an optional radiator or heat exchanger 18, a vapor absorption subsystem 22, and other motors (not shown) may also be in one or both of a fluid communication and a thermal communication with the waste heat conduit system 14. It should be understood that the waste heat conduit system 14 of the present technology may be designed with many different variations and configurations, as desired. FIG. 1 is generally shown to indicate the basic relationship between the waste heat conduit system 14 and other vehicle components. In various aspects, the waste heat conduit system 14 may be separated into different regions, optionally operating at slightly different temperatures.

In various aspects, at least one controller 24 may be provided to control various devices, systems, and methods according to the present teachings. The controller 24 may include one or more processors with software and appropriate algorithms that may cooperate with one or more thermostats, other controllers, or computer systems of the vehicle, which are not specifically shown herein for purposes of simplicity. Thus, it should be understood that the controller 24 may be in direct or indirect communication with various components of the system, even if it is not specifically shown. Certain methods may use computer program products accessible from a computer-usable or computer-readable medium providing program or software code that can be used with a computer, computing device, server, remote server, or any other type of execution system. For purposes of this description, and as known to those of ordinary skill in the art, a computer-usable or computer-readable medium can include any device or apparatus that can contain, store, communicate, propagate, or transport the program for use by or in connection with an instruction execution system, apparatus, or device.

In one example, the controller 24 may be configured to monitor, operate, and separately direct a flow of waste heat, optionally using various valves, through the waste heat conduit system 14. Depending on the desired temperature for use with the absorption cycle based system, it may be necessary to pass the waste heat through one or more heat exchangers 18 in order to lower a temperature of the waste heat, as may desired. In another example, the controller 24 may be configured to monitor, operate, and separately control a flow of refrigerant, optionally using various valves, through a refrigerant conduit 38 provided in the vapor absorption system 22.

Figure 2:
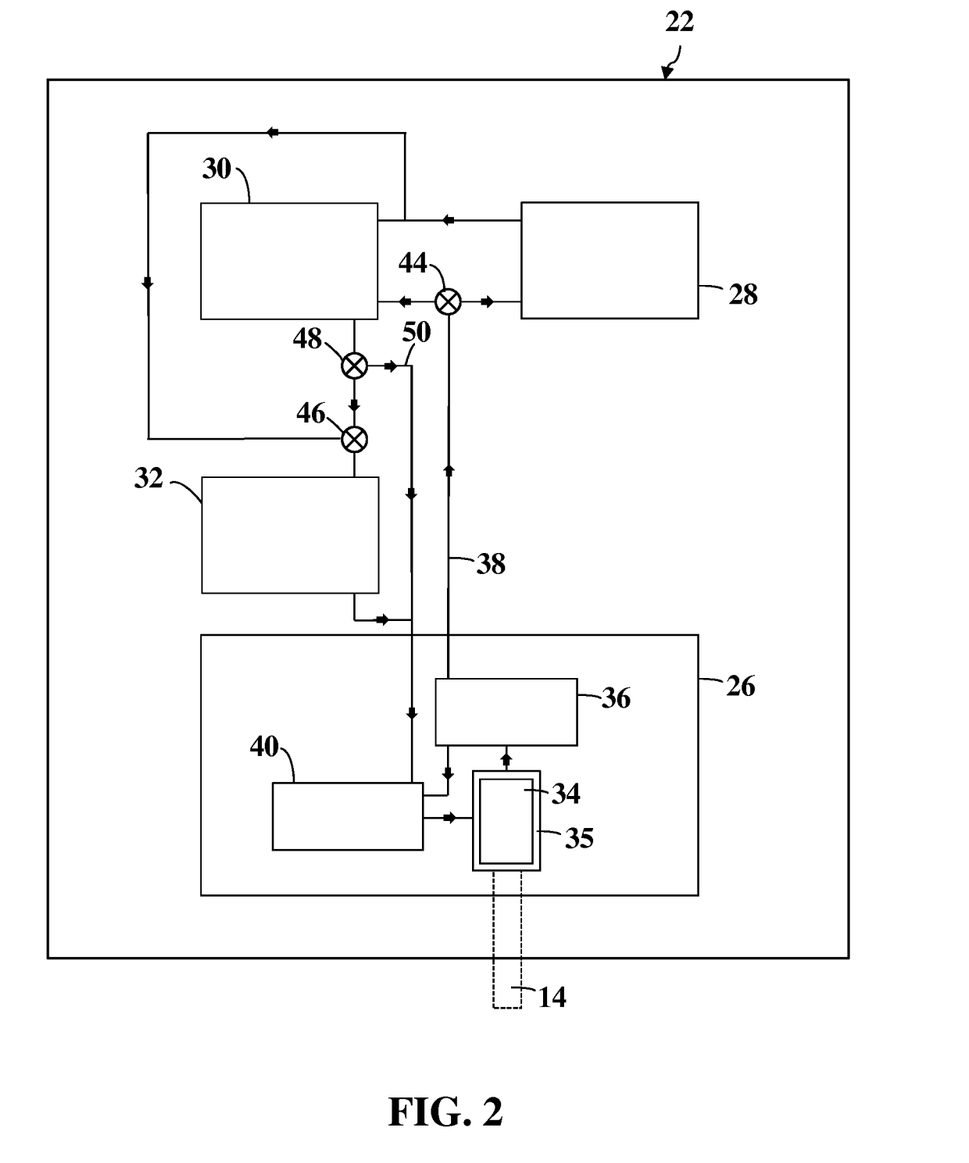
FIG. 2 is a schematic view with details of the absorption cycle based system shown in FIG. 1 according to a one aspect.

FIG. 2 is a schematic view with details of the absorption cycle based system 12 shown in FIG. 1 according to a first aspect. The system 12 may include a vapor absorption subsystem 22 generally including a thermal compressor unit 26, a radiator 28, a condensing unit 30, and an evaporator unit 32. As shown, the thermal compressor unit 26 may include a heat exchanger 34 in thermal communication with the waste heat conduit 14. The heat exchanger 34 may be configured to transfer heat to a separator unit 36 that vaporizes a refrigerant transferred throughout the vapor absorption subsystem 22 via a suitable refrigerant conduit 38. A flow direction of vapor and/or liquid refrigerant is represented on the conduit 38 using directional arrows for simplicity. The thermal compressor unit 26 may also include an absorber unit 40 to store liquid refrigerant.

Generally, the thermal compressor unit 26 operates similar to a continuous absorption based refrigeration system operated by the application of a limited amount of heat, preferably with no moving parts required to be employed. In various aspects, the heat exchanger 34 may be a heat pipe bundle type heat exchanger. The heat exchanger 34 provides thermal communication between the waste heat conduit 14 and the thermal compressor 26. In various aspects, the heat exchanger 34 is configured to provide heat to the thermal compressor at a substantially consistent temperature, generally a temperature commensurate with the operating temperature range of the engine coolant or engine exhaust stream of the power generating unit 20, as discussed above.

As an example, a heat pipe bundle could be coupled to, plugged into, or otherwise in thermal communication with, the waste heat conduit 14. It should be understood that the exact location of the coupling may vary depending on the system design. In a heat pipe heat exchanger, typically a high temperature exhaust gas or engine coolant passes through one end of the heat pipes, where heat pipe evaporators are located. As is known, the working fluid within the heat pipes may be water, a water based solution, or other suitable liquid medium. The working fluid transfers heat from the waste heat conduit 14 to a condenser side of the heat pipe, which is adjacent the separator unit 36, in order to heat/boil a refrigerant used in the vapor absorption subsystem 22. In various aspects, the refrigerant can include an absorption-based refrigerant selected from the group consisting of: ammonia and water; and lithium bromide and water; and ammonia, water, and hydrogen. Other refrigerant systems/chillers may also be used. In an example where ammonia is used, the applied heat boils ammonia vapor out of an ammonia/water solution, resulting in a relatively high pressure vapor with an increased condensation temperature. The vapor is typically passed through a separator unit 36 to separate ammonia from a weak ammonia solution, which may be sent back to an absorber 40 as a dilute ammonia water mixture. As the dilute mixture of ammonia and water leaves the separator unit 36 and flows to the absorber 40, it is cooled and develops an attraction for ammonia. In turn, this attraction is a driving force to draw gaseous or liquid ammonia from the evaporator/condenser. A strong ammonia solution then flows from the absorber 40 back to the heat exchanger 34, and the process repeats. As opposed to typical vapor compression based air conditioning systems that may use Freon with pressures that vary from between about 70-300 psi, the pressures of the thermal compressor system 26 will only vary by about 1 or 2 psi. Additionally, for this type of system, a pump is not necessary to move the refrigerant because the heat pipe bundles may serve as a percolator to raise the solution to the highest pressure. Thus, in various aspects, electrical power may only be needed to operate bypass valves and air blowers. Accordingly, efficiency and lower operating costs may be achieved. If a heat pipe exchanger is not used, this may require the use of a pump after the absorber 40 in order to move the refrigerant.

It should be understood that a heat pipe system is just one example of a heat exchanger that can be used with the current technology. For example, a thermosyphon or any other type of thermal conductor may also be used. A heat exchanger capable of exchanging heat between an exhaust gas or engine coolant and the ammonia solution (or other refrigerant) can also be used. With renewed reference to FIG. 1, the system may also include one or more solar energy collectors 21 in thermal communication with the waste heat conduit 14, or otherwise configured to provide heat to the thermal compressor to heat the refrigerant. The solar energy collectors 21 may also be configured to directly convert solar energy into electricity. In one example, the solar energy may provide power for supplemental heating or cooling of a vehicle compartment, which may especially be useful when the vehicle is parked, in stop-and-go traffic, or when the power generating unit of the vehicle is not in an operational mode or is not generating heat. In one non-limiting example, a fan unit 23 can be provided, configured to use electricity from the solar energy collector and provide supplemental cooling of the vehicle compartment.

Additionally, or alternatively, a phase change material 35 may be provided in thermal communication with at least one of the waste heat loop 14, the heat exchanger 34, and the power generating unit 20, and the like. The phase change material is configured to supply heat to the thermal compressor at the substantially consistent temperature. In one example, the evaporator end of the heat pipe heat exchanger can be covered with a volume of phase change material capable of storing energy for later usage when the engine or power generating unit is shut down or is not providing adequate heat. The phase change material selection may vary, for example, being based on a desired melting point. In certain aspects, zinc may be used as a phase change material. In certain aspects, water may also be used.

With reference to FIG. 2, the refrigerant loop 38 may couple an output from the separator unit 36 with a first valve 44, such as a three-way valve, capable of directing high pressure refrigerant vapor to either the radiator unit 28 or the heating/condensing unit 30. If cooling of the vehicle compartment is desired, the three-way valve 44 will be in a position to direct the entire refrigerant vapor to the radiator unit 28. There, the refrigerant, such as high temperature and high pressure ammonia vapor, condenses. For example, because the condensing temperature is higher than an ambient temperature, heat moves from the radiator unit 28 to the ambient air and condenses the ammonia vapor. The high pressure liquid may then be passed through a throttling valve 46 that reduces the pressure. Although the throttling valve 46 is shown downstream of the condenser unit 30, the throttling valve may also be located between the radiator 28 and the condenser unit 30. A second three-way valve 48 is provided to close a by-pass loop 50 when the throttling valve 46 is used. Reducing the pressure also reduces the boiling point temperature. Thus, as the low-pressure liquid refrigerant passes into the evaporator unit 32, it is boiled at this lower temperature and pressure. Since the boiling temperature is now lower than the temperature of the conditioned air, heat moves from a conditioned air stream into the evaporator unit 32 and causes a cooling effect.

With systems that use hydrogen, a throttle valve may not necessarily be required to lower the pressure of the refrigerant. For example, an evaporator may be provided with hydrogen, and the hydrogen passes across a surface in contact with the refrigerant. In turn, this lowers the refrigerant vapor pressure sufficiently to allow the refrigerant, such as liquid ammonia, to evaporate. The use of this type of system can decrease an air temperature to a much lower degree, and can be used if freezing temperatures are desired.

Air passing through the evaporating unit 32 is cooled and can be used for a variety of purposes. In various aspects, the air can be used to cool one or more vehicle compartments, either singly or in combination. Importantly, the vehicle compartment may not be limited to just include a passenger cabin. It is envisioned that cooled air can be used to supply a cooling effect to one or more electronics or electronics housing. In vehicles that use a turbocharger or supercharger, the present technology can be used to provide cool air for an engine compartment, for example, for the air intake directed to the engine or turbocharger or supercharger intercooler. It is also contemplated that the present technology will be able to serve as an energy efficient solution to supply cold air or a cooling effect for a refrigeration compartment in a vehicle. Not only can the refrigeration compartment be used for cooling food or beverages, the present technology can provide a stable and efficient solution for the transportation or emergency transport of blood, organs, or other tissues for hospital, surgical, and/or other medical use. Still further, the present technology can also be used with the thermal management of one or more battery packs, for example, a hybrid vehicle battery pack 25. In this regard, a phase change material may also be used to ensure such a thermal management system functions properly when, for example, a hybrid vehicle operates in an EV mode.

If heating of the vehicle compartment is desired, the first three-way valve 44 will be adjusted in a position to direct an entirety of the refrigerant vapor from the separator unit 36 to the condensing unit 30 in order to generate a heating effect. The condensed refrigerant will flow from the second three-way valve 48 through the by-pass 50, and directed back to the absorber 40 of the thermal compressor 26. Air can be passed through the condensing unit and be directed to one of the vehicle compartments as discussed above.

If a dehumidifying operation is desired, the first three-way valve 44 will similarly be adjusted in a position to direct an entirety of the refrigerant vapor from the separator unit 36 to the condensing unit 30 in order to generate a heating effect. The second three-way valve 48 is adjusted and configured to direct the refrigerant to flow through the throttling valve and into the evaporating unit 32 to generate a cooling effect. In this regard, humid air may be passed through the cooled evaporating unit 32 first, in order to condense water vapor and dry the air to a certain degree. The relatively dry air may then be passed through the condensing unit 30 in order to heat the air to a desired temperature. The dry, heated air may then be directed to one or more vehicle compartments, as described above.

In addition to the systems described above, the present technology additionally provides methods for selectively heating, cooling, and dehumidifying a vehicle compartment using waste heat recovered from a vehicle. The methods may begin by collecting waste heat from a power generating unit of the vehicle or, alternatively by harvesting heat or electricity from a solar energy collector. The waste heat and/or solar heat may be used to operate a thermal compressor of a vapor absorption subsystem. In various aspects, the thermal management operations may selectively include generating a cooling effect in the vehicle compartment by condensing a vapor phase refrigerant within a radiator, and directing a flow of condensed refrigerant through a throttling valve to an evaporating unit in thermal communication with the vehicle compartment. In other aspects, the operations may also selectively include generating a heating effect in the vehicle compartment by directing a flow of vapor phase refrigerant to a condensing unit in thermal communication with the vehicle compartment. The operations may also selectively include dehumidifying air from the vehicle compartment by condensing a vapor phase refrigerant within a radiator and directing a flow of condensed refrigerant through a three way valve. The dehumidification process may include directing condensed refrigerant though the throttling valve to the evaporating unit, and directing condensed refrigerant to the thermal compressor. The method may include passing humid air through the cooled evaporating unit to condense water vapor prior to passing the air though the evaporating unit to heat the air that is subsequently directed into the vehicle compartment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An absorption cycle based system for using waste heat from a vehicle and providing selective heating, cooling, and dehumidifying to a vehicle compartment, the system comprising:
   a waste heat loop in thermal communication with a power generating unit of the vehicle;
   a vapor absorption subsystem comprising:
   an absorption-based refrigerant;
   a thermal compressor, including a separator unit, in thermal communication with the waste heat loop;
   a radiator unit;
   a condensing unit for heating the vehicle compartment;
   an evaporating unit for selectively cooling and dehumidifying the vehicle compartment, the evaporating unit selectively receiving the refrigerant from the radiator unit and the condensing unit;
   a heat exchanger directly connected to the waste heat loop and providing thermal communication between the waste heat loop and the thermal compressor, the heat exchanger disposed within a housing and surrounded by a phase change material, the phase change material provided in thermal communication with the heat exchanger and the thermal compressor, and configured to provide heat to the thermal compressor at a substantially consistent temperature;
   a first valve configured to selectively direct refrigerant from the thermal compressor to the radiator unit and the condensing unit; and
   a second valve configured to selectively direct refrigerant from the condensing unit to one or both of the evaporating unit and the thermal compressor.

2. The system according to claim 1, further comprising a throttling valve disposed between the condensing unit and the evaporating unit.

3. The system according to claim 1, wherein at least one of the first valve and the second valve comprises a three-way valve.

4. The system according to claim 1, further comprising a bypass loop directing refrigerant from the condensing unit to an absorber of the thermal compressor, bypassing the evaporating unit.

5. The system according to claim 1, wherein the heat exchanger comprises a heat pipe heat exchanger.

6. The system according to claim 1, wherein the phase change material is also in thermal communication with at least one of the waste heat loop and the power generating unit.

7. The system according to claim 1, further comprising a solar energy collector in direct thermal communication with the waste heat loop, configured to provide heat to the thermal compressor to heat the absorption-based refrigerant disposed in the thermal compressor.

8. The system according to claim 1, further comprising:
   a solar energy collector; and
   a fan unit driven by the solar energy collector,
   wherein the fan unit is configured to provide supplemental cooling of the vehicle compartment when the power generating unit of the vehicle is not in an operational mode or is not generating heat.

9. The system according to claim 1, wherein the waste heat loop comprises at least one of an engine exhaust loop and an engine coolant loop in selective thermal communication with the thermal compressor.

10. The system according to claim 1, wherein the vehicle compartment includes at least one of a passenger cabin, an electronics housing, a battery pack, an engine compartment, and a refrigeration compartment.

11. The system according to claim 1, configured to preheat a hybrid vehicle battery pack during vehicle startup operations.

12. The system according to claim 1, wherein the absorption-based refrigerant is selected from the group consisting of:
   ammonia and water;
   lithium bromide and water; and
   ammonia, water, and hydrogen.

13. An absorption cycle based system for using waste heat from a vehicle and providing selective heating, cooling, and dehumidifying to a vehicle compartment, the system comprising:
   a waste heat loop in thermal communication with a power generating unit of the vehicle;
   a vapor absorption subsystem comprising:
   an absorption-based refrigerant;
   a thermal compressor, including a separator unit, in thermal communication with the waste heat loop;
   a radiator unit;
   a condensing unit for heating the vehicle compartment;
   an evaporating unit for selectively cooling and dehumidifying the vehicle compartment, the evaporating unit selectively receiving the refrigerant from the radiator unit and the condensing unit;
   a solar energy collector in direct thermal communication with the waste heat loop, configured to provide heat to the thermal compressor to heat the absorption-based refrigerant disposed in the thermal compressor; and
   a heat exchanger directly connected to the waste heat loop and providing thermal communication between the waste heat loop and the thermal compressor, the heat exchanger disposed within a housing and surrounded by a phase change material, the phase change material provided in thermal communication with the heat exchanger and the thermal compressor, and configured to provide heat to the thermal compressor at a substantially consistent temperature.

* * * * *

UNITED STATES PATENT AND TRADEMARK OFFICE
CERTIFICATE OF CORRECTION

PATENT NO. : 10,996,000 B2
APPLICATION NO. : 14/932564
DATED : May 4, 2021
INVENTOR(S) : Feng Zhou et al.

Page 1 of 1

It is certified that error appears in the above-identified patent and that said Letters Patent is hereby corrected as shown below:

In the Specification

Column 1, Line 37: delete "NO emissions" and insert -- $NO_x$ emissions --

Signed and Sealed this
Sixth Day of July, 2021

Drew Hirshfeld
*Performing the Functions and Duties of the
Under Secretary of Commerce for Intellectual Property and
Director of the United States Patent and Trademark Office*